Figure 1:
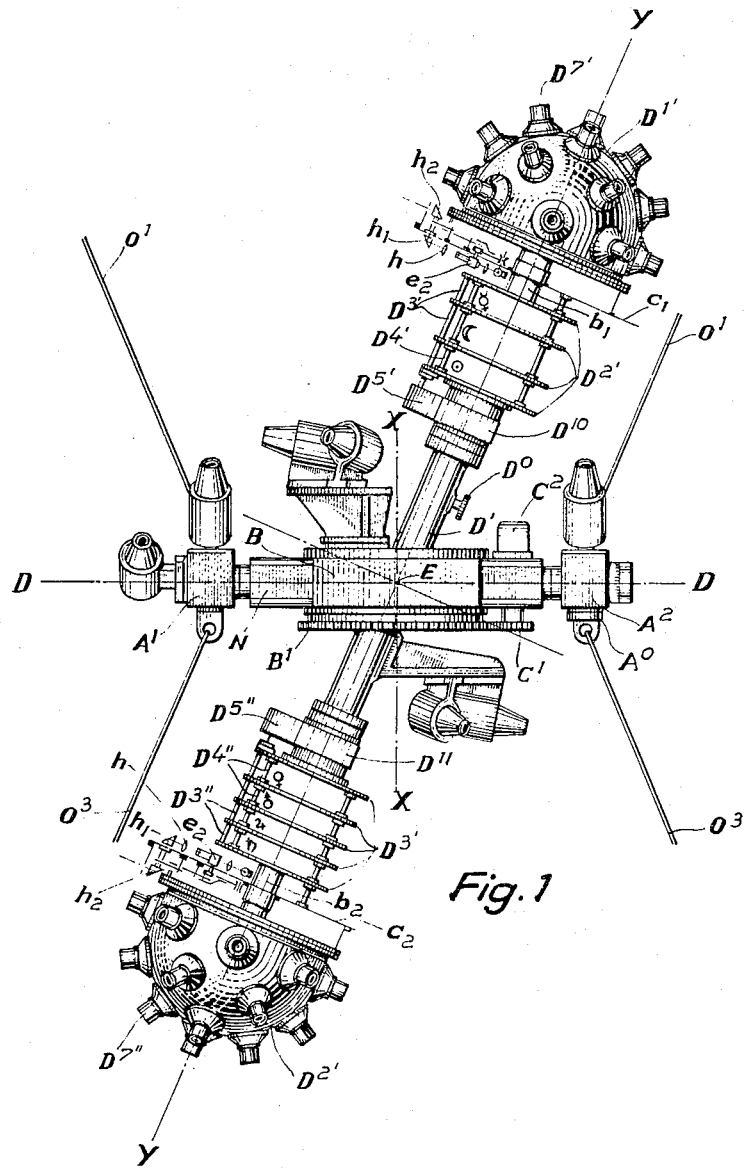

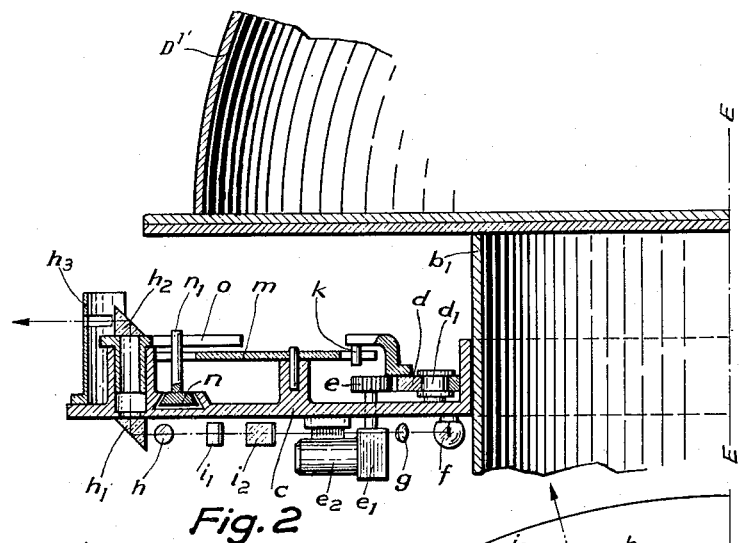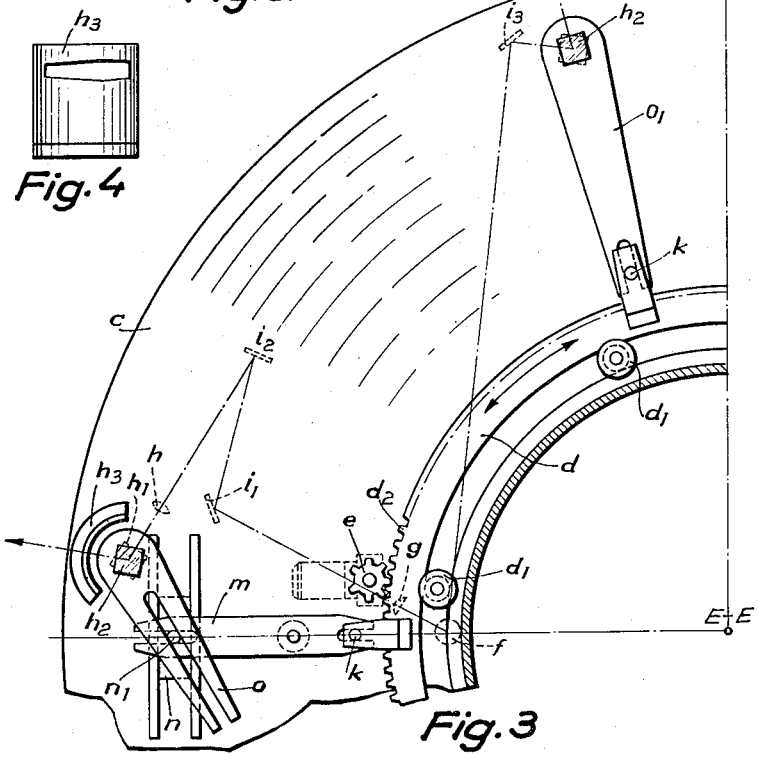

United States Patent Office 2,748,652
Patented June 5, 1956

2,748,652

PLANETARIUM PROJECTION DEVICE FOR REPRESENTING THE INDIVIDUAL TRAVEL OF FIXED STARS UPON A SCREEN

Walther Bauersfeld, Heidenheim (Brenz), Helmut Werner, Oberkochen, and Albin Vieweg, Heidenheim (Brenz), Germany, assignors to Carl Zeiss, Heidenheim (Brenz), Germany Application June 29, 1953, Serial No. 364,626

Claims priority, application Germany July 2, 1952

4 Claims. (Cl. 88—24)

This invention is concerned with a further extension of the scope of projection planetaria such as that described in U. S. Patent specifications Nos. 1,616,736 and 1,693,969 (German Patents Nos. 391,036 and 439,557). Besides showing the daily revolution of the starry heavens and the apparent motions of the sun, moon, planets, and comets, as well as the projection of constellations, eclipses, and shooting stars, apparatus for showing the individual apparent travel of certain fixed stars has lately been developed. As is well known, numerous fixed stars execute movements of their own extending through very great stretches of time, and which can be regarded as approximately the consequence of a rectilinear traverse of the star taking place at constant velocity in the universe, an assumption which would seem admissible in view of the results of observation.

To the observer on earth, such individual movements appear as the traverse of a star at a relatively increasing or decreasing velocity along a great circle on the celestial sphere, the increase or decrease depending upon whether the star approaches our solar system or recedes from it. For representing this traverse, a separate projection apparatus is required for each fixed star, since the individual movements of different fixed stars take place independently of one another in different directions and at different velocities.

Inasmuch as the number of fixed stars which execute such movements of their own is very large, it is practically impossible to represent the motions of any larger number of such stars by using a separate and independent projector and motion mechanism for each star. The present invention now opens a way whereby, in spite of these difficulties, a simultaneous representation of the individual motions of all larger stars can be obtained by relatively simple means. This solution of the problem is based on the fact that it is not necessary to govern, for each individual star, the entire projection apparatus in accordance with the movement to be shown, but that it suffices if each projection apparatus contains a suitable optical member, such as a revolvable mirror, by whose motion the requisite course of the star is made to appear on the projection surface.

The aim of the invention is attained by providing, for each fixed star, a projector with a suitably governed optical part which produces a movement of the star image on the projection surface, and governing all of these optical parts by a common control ring approximately concentric with the ecliptic axis of the planetarium and capable of rotation in either direction. With such an arrangement, the various individual star projectors can be applied to one common annular carrier fixedly connected with the ecliptic-axis framework and bearing also the ring for governing the movable optical components of the star projectors.

If this control ring is rotated around the ecliptic axis (which can be effected by any conventional means, e. g. by an electric motor), then all connected star projectors will move to correspond, thereby showing the simultaneous motions of all pertinent star images on the projection surface. Since the star projectors are relatively close to one another, it is expedient to use a single source of light for a number of projectors, an arrangement which gives a material simplification.

In addition, it will be advisable to equalize the length of the light paths between the light source and the projection objectives, so that the same optical components can be employed in all projectors. Such an equalization of the path of the light can be effected by means of deflecting mirrors, reflecting prisms, or the like. The rotation of the control ring can be transmitted to the moving optical components of the star projectors with the aid of various customary means, as for instance gears, lever linkages, slot guides, or the like. It goes without saying that these transmission elements must produce the correct transmission ratio for each individual star projector, as is necessary to obtain a uniform lapse of time in the star traverse movements represented.

Similarly, the direction of motion of the star on the projection screen must correspond to the actual traverse of the star along the heavens, as can be effected by suitably modifying the transmission mechanism.

If it is desired to consider also the varying rate of movement of a fixed star, this can be attained by employing a slot guide based on the assumption mentioned at the beginning, that the fixed star moves rectilinearly through space at a constant velocity. On this assumption, the apparent velocity of the fixed star increases to a maximal value, which is attained when the star is at its shortest distance from the location of the observer. Thence onward the velocity declines asymptotically to a final value of zero. Such a variation in velocity can be represented in a simple manner by connecting the optical component which produces the star image on the projection screen, with a directant link governed by a guide pin disposed laterally of its axis of rotation to move in a straight line and at uniform speed. When this link in its motion is perpendicular to the path of the guide pin, the star has attained its apparent maximal velocity, which declines upon further movement in either direction.

Accompanying the change in the apparent rate of motion of the fixed star is a corresponding change in its brightness. This phenomenon, too, can be combined with the representation of the apparent travel of fixed stars by causing to coact, with the link directing the optical component of the star projector, a diaphragm or some other light-throttling member which automatically varies the brightness of the image-forming cone of rays. This effect can be attained, for instance, by an iris diaphragm coupled with the directant link, or else by a fixed taper slot diaphragm which throttles the light cone more or less in accordance with the direction of projection, or by some other light-reducing means.

The invention is illustrated in the accompanying schematic sketch. Fig. 1 shows an elevation of a planetarium according to U. S. Patent specification No. 1,693,969 providing the supplement according to the invention. Fig. 2 shows a section through the supplement along the ecliptic axis. Fig. 3 is the corresponding plan view, Fig. 4 shows a light-limiting diaphragm for the star. For reasons of better clearance, Fig. 3 shows only two fixed star projectors and pertinent means for transmitting the motion of the control ring to the corresponding optical projector components. It will be clear that on the common base plate, a larger number of projectors with their mechanisms can be accommodated.

The device shown in Fig. 1 serves for projecting the fixed stars, the sun, the moon, and the planets Mercury, Venus, Mars, Jupiter and Saturn, and certain fixed stars and for illustrating the motion of these celestial bodies relatively to the earth on the projection screen in such a way as perceived from a certain definite point on the earth. In the figure the mechanisms for producing the motion of the parts requisite for the projection of the celestial bodies ☉, ☾, ☿, ♂, ♃, and ♄ have, for clearness, been left out for the most part and only the appertaining astronomical sign has been inscribed at the place where the corresponding mechanisms must be fitted. The mechanisms may entirely correspond to those shown in the constructional example of the American patent specification 1,616,736, so that it was unnecessary to illustrate them in this case.

The carrying body B in which the shaft D' is supported rotatably about the axis Y—Y, which embraces with the axis of rotation X—X of the carrying body B the angle $=23\frac{1}{2}°$, is not directly supported rotatably on a stand rigidly fitted but on the body N, which by means of two pivots is supported on two carrying bars $A^1$ and $A^2$ rotatable about an axis D—D in such a way that this axis is perpendicular to the axis of rotation X—X and thereby traverses the point of intersection E of the axes of rotation X—X and Y—Y. The carrying bars $A^1$ and $A^2$ are assumed to be suspended with the aid of ropes $O^1$ and $O^3$ within a suitable spherical projection screen in such a way that the point of intersection E lies in the centre of the projection room and that the axis of rotation D—D is horizontal, whereby other ropes ensure an invariable position of the carrying bars $A^1$ and $A^2$. By rotating the body N about the axis of rotation D—D it is possible to impart to the axis of rotation X—X, representing the earth axis, any desired position relatively to the horizontal plane determined by the axis of rotation D—D, so that any desired latitude will be adjustable. In the drawing the arrangement has been made in such a way that the axis of rotation X—X is vertical, hence the device is adjusted according to a latitude of 90°. In order to secure the latitude chosen, provision is made for a set-screw $A^0$ by means of which the body N may be fixed relatively to the carrying bars $A^1$ and $A^2$.

The carrying body B is actuated by means of a pair of toothed wheels $B^1$, $C^1$ from a shaft supported in the body N and actuated by a motor $C^2$. The shaft D' is supported rotatable about the axis Y—Y in the carrying body B and fixable by a set-screw $D^0$ relatively to the carrying body B. The shaft D' is screwed to two carriers $D^{10}$ and $D^{11}$. The carrier $D^{10}$ carries four plates $D^{2'}$ and the carrier $D^{11}$ five plates $D^{2''}$, which are perpendicular to the axis Y—Y and screwed together with the aid of bolts $D^{3''}$ respectively. The mechanism for producing the motion of the parts requisite for the projection of the bodies of the solar system are assumed to be fixed between these plates, viz. between the plates $D^{2'}$ of the carrier $D^{10}$ the mechanisms for projecting the sun, the moon and Mercury and between the plates $D^{2''}$ of the carrier $D^{11}$ the mechanisms for projecting Venus, Mars, Jupiter and Saturn as indicated by the corresponding astronomical signs. For actuating the first-named mechanisms a shaft $D^{4'}$ is provided which is actuated by a motor $D^{5'}$ fixed on the carrier $D^{10}$, while for actuating the last-named mechanisms serves a shaft $D^{4''}$, actuated by a motor $D^{5''}$ fixed on the carrier $D^{11}$.

To the end plates $D^{2'}$ and $D^{2''}$ two hemispherical casings $D^{1'}$ and $D^{1''}$ respectively are fixed by carriers $b_1$, $b_2$ in such a way that the centre of the spheres respectively lies on the axis of rotation Y—Y. On each of these two casings there is fixed a plurality of projection apparatus $D^{7'}$ and $D^{7''}$ respectively, of which the drawing only shows seven on each casing and each of which serves for projecting a part of the fixed star sky, in such a way that their axes intersect at the centre of the spheres respectively. In each of the said two casings there is disposed, common to the appertaining projection apparatus, a glow lamp respectively, whose filaments enclose the appertaining centres of the spheres respectively. The projection apparatus $D^{7'}$ and $D^{7''}$ are assumed to be distributed on the casings $D^{1'}$ and $D^{1''}$ in such a way that the whole northern and the southern fixed star sky can be projected, whereby the fixed star-images are so traced on the lantern slides of these projection apparatus that the projection seems to take place from the joint point of intersection E of the axes X—X, Y—Y and D—D.

Annular base plates $c_1$, $c_2$ are fixedly connected concentrically with cylinders $b_1$, $b_2$ carrying the hemispherical casings $D^{1'}$, $D^{2'}$. The said base plates bear projecting means as lenses $h$ and prisms $h_1$, $h_2$ and means adapted to control the said projector for representing the individual movements of certain fixed stars according to the invention. These parts are shown in Figs. 2–4 in a greater measure.

The annular base plate $c$ fixedly connected with carrier $b_1$ bears a controlling ring $d$ concentric with the ecliptic axis E—E (Figs. 2, 3). Ring $d$ is guided by several rolls $d_1$ and controls all connected fixed-star projectors. Over part of its circumference, ring $d$ has gear teeth $d_2$, which mesh with a pinion $e$. Pinion $e$ is connected via a suitable gear set $e_1$ to an electric motor $e_2$, by means of which control ring $d$ can be given a rotating motion in either direction.

Control ring $d$ carries the various driving members for the fixed star projectors mounted on base plate $c$. Two different motion mechanisms have been assumed for the two projectors indicated on the drawing, viz. a lever motion in connection with a slot guide for representing a variable velocity, and a plain lever transmission. Common to all projectors to be assumed as mounted on base plate $c$, is an incandescent lamp $f$ serving as a source of light. From this lamp, light passes in each case by way of a condenser $g$ which is to be imagined as connected with a suitable hole diaphragm, into an objective $h$, which forms an image of the diaphragm on the projection screen by way of a fixed reflecting prism $h_1$ and a movable reflecting prism $h_2$.

These optical parts must be imagined as uniform for all projectors mounted on $c$. The path of the light from lamp $f$ to objective $h$ is of the same length in all projectors, equalization being effected in the one example shown by means of two deflecting mirrors $i_1$ and $i_2$, and in the other example by a single mirror $i_3$. The movable reflecting prism $h_2$ is governed in each projector from ring $d$ according to the motion of the fixed star to be represented. For this purpose, ring $d$ carries a guide pin $k$ for each projector. In one of the examples shown, pin $k$ coacts with a first-class lever $m$. By its other end, lever $m$ moves a slide $n$ carrying a guide pin $n_1$, along a straight guideway, pin $n_1$ in its turn engaging in the slot of a directant $o$ fixedly connected with prism $h_2$.

The kinematic ratios of this transmission are in each case adapted to the apparent movement of the fixed star concerned. Accordingly, the star will be seen to move at different velocities in accordance with the momentary position of directant $o$ relative to the guideway of pin $n_1$. In order to show also the variation in brightness, the path of the rays contains, ahead of reflecting prism $h_2$, a fixed diaphragm $h_3$ with an aperture tapering towards each end, so that the generating light will vary in brightness according to the prevailing position of $o$. In the second example represented, guide pin $k$ engages directly in the slot of a directant $o_1$ connected with prism $h_2$, thereby moving prism $h_2$ at a uniform rate, so that the fixed star represented shows a uniform velocity of traverse.

The light paths of both projectors are indicated by dot-and-dash lines, and it is assumed that projection takes place about at right angles to the ecliptic axis. It is, however, easily possible, by suitably designing reflecting prism $h_2$, to form a different projection arrangement. Likewise, a star course inclined at any angle to the ecliptic axis can be shown. All that is necessary in this latter case is to adapt the transmission means between control ring $d$ or the connected guide pin $k$ and prism $h_2$ to the obliquity of the path of the star.

We claim:
1. Planetarium projection device for projecting images of the stars, including the fixed stars, comprising a carrying appliance, a plurality of groups of projecting apparatus and a projection viewing surface, two hollow bodies; one group of the said projection apparatus being disposed at the one, and the other group being disposed at the other of these two hollow bodies, each hollow body containing a source of light, common to all projection apparatus appertaining to this body, the said two hollow bodies being rigidly connected together and rotatably supported on the said carrying appliance and means for rotating the said two hollow bodies; at least one of the said hollow bodies being combined with an annular base plate connected with the rotatable supporting means connecting said hollow bodies, said annular base plate carrying projection apparatus adapted to project the images of a number of fixed stars, the individual movements of which are to be represented, a control ring carried by said base plate rotatable at least approximately concentrically with the axis of the ecliptic of the device and coupled with said projection apparatus carried by said annular base plate, and that coupled by levers adapted to rotate and displace optical elements of said projecting apparatus, means adapted to give a rotation in either direction to said control ring.

2. Device according to claim 1, said levels coupling said control ring with said projection apparatus carried by said annular base plate having slots, the one of which cooperates with a pin connected to said control ring and the other cooperates with a pin connected to a slide guided on said annular ring along a straight guidance, a deflecting prism adapted to reproduce the apparent movement of a fixed star, said prism being connected to a directant having a slot, said slot being engaged by said sliding pin.

3. Device according to claim 1, said annular base plate carrying a common light source for a group of said projection apparatus appertained to said base plate and reflecting means adapted to equalise the light paths between said fixed light-source and the objectives of said projection apparatus.

4. Device according to claim 1, the projection apparatus carried by said annular base plate being combined with a diaphragm fixed on said annular base plate and having an aperture tapering towards each end.

References Cited in the file of this patent
UNITED STATES PATENTS

| | | |
|---|---|---|
| 1,616,736 | Bauersfeld | Feb. 8, 1927 |
| 1,693,969 | Villiger et al. | Dec. 4, 1928 |
| 2,168,799 | Korkosz et al. | Aug. 8, 1939 |
| 2,178,352 | Unglaube et al. | Oct. 31, 1939 |
| 2,483,216 | Marshall | Sept. 27, 1949 |
| 2,632,359 | Spitz | Mar. 24, 1953 |

FOREIGN PATENTS

| | | |
|---|---|---|
| 322,507 | Germany | July 1, 1920 |